United States Patent
Ramanujan et al.

(10) Patent No.: US 6,330,018 B1
(45) Date of Patent: Dec. 11, 2001

(54) METHOD AND APPARATUS FOR PRINTING HIGH RESOLUTION IMAGES USING REFLECTIVE LCD MODULATORS

(75) Inventors: Sujatha Ramanujan, Pittsford; Janet Donner, Scottsville, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/470,930

(22) Filed: Dec. 22, 1999

(51) Int. Cl.⁷ .................... B41J 2/47; G02F 1/13
(52) U.S. Cl. .................. 347/239; 347/244; 349/2
(58) Field of Search .................. 347/239, 255, 347/241, 256, 244; 359/244, 259, 247, 263, 494; 349/2, 3, 5, 85, 96; 353/31

(56) References Cited

U.S. PATENT DOCUMENTS

| | | |
|---|---|---|
| 4,728,965 | 3/1988 | Kessler et al. ............ 347/241 |
| 5,061,049 | 10/1991 | Hornbeck ................ 359/224 |
| 5,109,290 * | 4/1992 | Imai ...................... 349/2 |
| 5,325,137 | 6/1994 | Konno et al. ............. 353/63 |
| 5,414,553 * | 5/1995 | Nochebuena et al. ....... 359/259 |
| 5,461,410 | 10/1995 | Venkateswar et al. ...... 347/240 |
| 5,461,411 | 10/1995 | Florence et al. .......... 347/240 |
| 5,504,514 | 4/1996 | Nelson ................... 347/130 |
| 5,517,340 * | 5/1996 | Doany et al. ............. 349/5 |
| 5,521,748 | 5/1996 | Sarraf ................... 359/321 |
| 5,626,411 | 5/1997 | Takahashi et al. ......... 358/302 |
| 5,652,661 | 7/1997 | Gallipeau et al. ......... 358/302 |
| 5,701,185 | 12/1997 | Reiss et al. ............. 358/471 |
| 5,715,029 | 2/1998 | Fergason ................. 349/196 |
| 5,721,622 | 2/1998 | Venkateswar ............. 358/298 |
| 5,727,860 | 3/1998 | Broer et al. ............. 353/20 |
| 5,743,610 | 4/1998 | Yajima et al. ............ 353/31 |
| 5,743,612 | 4/1998 | Matsuda et al. ........... 353/97 |
| 5,745,156 | 4/1998 | Federico et al. .......... 347/256 |
| 5,754,217 | 5/1998 | Allen .................... 347/239 |
| 5,754,305 | 5/1998 | DeClerck et al. .......... 358/302 |
| 5,786,934 * | 7/1998 | Chiu et al. .............. 359/494 |
| 5,805,274 | 9/1998 | Saita .................... 355/38 |
| 5,971,545 * | 10/1999 | Haitz .................... 353/31 |

* cited by examiner

Primary Examiner—Hai C. Pham
(74) Attorney, Agent, or Firm—Nelson Adrian Blish

(57) ABSTRACT

An apparatus for printing high resolution images on a photosensitive media (140) includes an array of LEDs (12) for forming a light beam uniformizing optics (45) and a condensor lens (70) which transforms the light beam to a telecentric beam. A polarizing beamsplitter (80) splits said telecentric beam into a first polarized beam and a second polarized beam and directs the first polarized beam to a first reflective LCD modulator (90) and directs the second polarized beam to a second reflective LCD modulator (95). The first reflective LCD modulator (90) rotates a first polarization state of the first polarized beam on a site by site basis to produce a first modulated polarized beam and reflects the first modulated polarized beam, in response to a first image data signal, through the polarizing beamsplitter (80). The second reflective LCD modulator (95) rotates the a second polarization state of the second polarized beam to produce a second modulated polarized beam and reflects the second modulated polarized beam, in response to a second image data signal, through the polarizing beamsplitter (80). A print lens(110) focuses the first and said second modulated polarized beams on the print media (140). In the preferred embodiment, the media is exposed in a color sequential manner with a two-dimensional color image. The media or the assembly may then be moved to a second position and a new image is printed.

38 Claims, 12 Drawing Sheets

METHOD AND APPARATUS FOR PRINTING HIGH RESOLUTION IMAGES USING REFLECTIVE LCD MODULATORS

FIELD OF THE INVENTION

This invention relates generally to a method for spatially and temporally modulating a light beam and more specifically to imaging a modulated light onto a photosensitive media.

BACKGROUND OF THE INVENTION

Photographic images are traditionally printed on photographic paper using conventional, film based optical printers. The photographic industry, however, is converting to digital imaging. One step in the digital printing process to use images obtained from digital cameras, or scanned film exposed in traditional photographic cameras, to create digital image files that are then printed onto photographic paper.

The growth of the digital printing industry has led to multiple approaches to digital printing. One of the early methods used for digital printing was cathode ray tube (CRT) based printers such as the Centronics CRT recorder. This technology has several limitations related to the phosphor and the electron beam. The resolution of this technology is inadequate when printing a large format image, such as 8 inch by 10 inch photographic print. CRT printers also tend to be expensive, which is a severe short coming in a cost sensitive market. An additional limitation is that CRT printers do not provide sufficient red exposure to the media when operating at frame rates above 10,000 prints per hour.

Another commonly used approach to digital printing is the laser based engine shown in U.S. Pat. No. 4,728,965. Such systems are generally polygon flying spot systems which use red, green, and blue lasers. Unfortunately, as with CRT printers, the laser based systems tend to be expensive, since the cost of blue and green lasers remains quite high. Additionally, the currently available lasers are not compact. Another problem with laser based printing systems is that the photographic paper used for traditional photography is not suitable for a color laser printer due to reciprocity failure. High intensity reciprocity failure is a phenomena by which photographic paper is less sensitive when exposed to high light intensity for a short period. For example, flying spot laser printers expose each of the pixels for a fraction of a microsecond, whereas optical printing systems expose the paper for the duration of the whole frame time, which can be on the order of seconds. Thus, a special paper is required for laser printers.

A more contemporary approach uses a single spatial light modulator such as a Texas Instruments digital micromirror device (DMD) as shown in U.S. Pat. No. 5,061,049. Spatial light modulators provide significant advantages in cost as well as allowing longer exposure times, and have been proposed for a variety of different printing systems from line printing systems such as the printer depicted in U.S. Pat. No. 5,521,748, to area printing systems such as the system described in U.S. Pat. No. 5,652,661.

One approach to printing using the Texas Instruments DMD, shown in U.S. Pat. No. 5,461,411, offers advantages such as longer exposure times using light emitting diodes (LED) as a source. See U.S. Pat. No. 5,504,514. However, this technology is not widely available. As a result, DMDs are expensive and not easily scaleable to higher resolution. Also, the currently available resolution is not sufficient for all printing needs.

Another low cost solution uses LCD modulators. Several photographic printers using commonly available LCD technology are described in U.S. Pat. Nos. 5,652,661, 5,701,185, and 5,745,156. Most of these designs involve the use of a transmissive LCD modulator such as is depicted in U.S. Pat. Nos. 5,652,661 and 5,701,185. While such methods offer several advantages in ease of optical design for printing, there are several drawbacks to the use of conventional transmissive LCD technology. Transmissive LCD modulators generally have reduced aperture ratios and the use of Transmissive Field-Effect-Transistors (TFT) on glass technology does not promote the pixel to pixel uniformity desired in many printing applications. Furthermore, in order to provide large numbers of pixels, many high resolution transmissive LCDs possess footprints of several inches. Such a large footprint can be unwieldy when combined with a print lens. As a result, most LCD printers using transmissive technology are constrained to either low resolution or small print sizes.

To print high resolution 8 inch by 10 inch images with at least 300 pixels per inch requires 2400 by 3000 pixels. Transmissive LCD modulators with such resolutions are not readily available. Furthermore, each pixel must have a gray scale depth to render a continuous tone print uniformly over the frame size, which is not available with this technology.

An alternate approach is to utilize reflective LCD modulators as is widely accepted in the display market. Most of the activity in reflective LCD modulators has been related to projection display. The projectors are optimized to provide maximum luminous flux to the screen with secondary emphasis placed on contrast and resolution. To achieve the goals of projection display, most optical designs use high intensity lamp light sources. Additionally, many projector designs use three reflective LCD modulators, one for each of the primary colors, such as the design shown in U.S. Pat. No. 5,743,610. Using three reflective LCD modulators is both expensive and cumbersome.

For projectors using a single reflective LCD modulator, color sequential operation is required. To maintain the high luminosity in combination with the color sequential requirements, a rotating color filter wheel is sometimes employed. This is yet another large, moving part, which further complicates the system.

The recent advent of high resolution reflective LCDs with high contrast, greater than 100:1, presents possibilities for printing that were previously unavailable. See U.S. Pat. Nos. 5,325,137 and 5,805,274. Specifically, a printer may be based on a reflective LCD modulator illuminated sequentially by red, green, and blue light emitting diodes. The reflective LCD modulator may be sub-apertured and dithered in two or three directions to increase the resolution.

Dithering has been applied to transmissive LCD systems due to the less than perfect fill factor. Incorporating dithering into a reflective LCD printing system would allow high resolution printing while maintaining a small footprint. Also, because the naturally high fill factor present in many reflective LCD technologies, the dithering can be omitted with no detriment to the continuity of the printed image. While devices such as the Texas Instruments DMD can incorporate a secondary mask as shown in U.S. Pat. No. 5,754,217, the mask is displaced in some embodiments of the device, which makes manufacturing more difficult and adds to the processing complexity of the device.

The use of a reflective LCD serves to significantly reduce the cost of the printing system. Furthermore, the use of an area reflective LCD modulator sets the exposure times at sufficient length to avoid or significantly reduce reciprocity failure.

The progress in the reflective LCD device field made in response to needs of the projection display industry have provided opportunities in printing applications. Thus, a reflective LCD modulator designed for projection display can be incorporated into the printing design with little modification to the LCD itself. Also, by designing an exposure system and data path with an existing projection display device allows incorporation of an inexpensive commodity item into the print engine.

Of the reflective LCD technologies, the most suitable to this design is one which incorporates a small footprint with an integrated Complementary Metal Oxide Semiconductor (CMOS) backplane. The compact size along with the uniformity of drive offered by such a device will translate into better image quality than other LCD technologies. There has been progress in the projection display industry towards incorporating a single reflective LCD, primarily because of the lower cost and-weight of single device systems. See U.S. Pat. No. 5,743,612. Of the LCD technologies, the reflective LCD with a silicon backplane can best achieve the high speeds required for color sequential operation. While this increased speed may not be as essential to printing as it is for projection display, the higher speeds can be utilized to incorporate additional gray scale and uniformity correction to printing systems.

While the reflective LCD modulator has enabled low cost digital printing on photosensitive media, the demands of high resolution printing have not been fully addressed. For many applications, such as imaging for medical applications, resolution is critical. Often, the resolution provided by a single reflection LCD modulator is insufficient. It then becomes necessary to create an image wherein multiple images are merged to create a single high-resolution image. Creating a merged image without artifacts along the borders, or in regions where image data may overlap, is desirable. While juxtaposing or spatially interweaving image data alone may have been attempted in previous applications, such a superposition of images with the use of reflective LCDs provides images of high quality without compromising the cost or productivity of the print engine. By utilizing polarization based modulation, a print engine can utilize light already available in the optical system.

While similar methods have been employed in projection systems, the use of a reflective LCD and dual polarization has not been used in the field of printing. In particular, because of the time delay involved in printing, artifacts present in the stitched imaged, as well as differences between multiple modulators can be corrected. These can be compensated through software adjustments. This approach is difficult for applications such as projection display, particularly motion imaging.

Juxtaposing or spatially interweaving image data has been attempted with some success in projection displays. Fergason, in U.S. Pat. No. 5,715,029, describes a method to improve resolution of a display by altering the beam path using a birfringent medium such as a calcite crystal or an electro-optic liquid crystal cell. For projection applications using a transmissive LCD, Philips Corporation deflects the beam path by using birefringent elements as shown in U.S. Pat. No. 5,727,860. Another method, using isotropic optical elements to juxtapose or spatially interweave images in a projection display using a transmissive LCD, is described in U.S. Pat. No. 5,626,411.

Modulator printing systems can incorporate a variety of methods to achieve gray scale. Texas Instruments employs a time delayed integration system that works well with line arrays as shown in U.S. Pat. Nos. 5,721,622, and 5,461,410. While this method can provide adequate gray levels at a reasonable speed, line printing Time Delayed Integration (TDI) methods can result in registration problems and soft images. Alternate methods have been proposed particularly around transmissive LCDs such as the design presented in U.S. Pat. No. 5,754,305.

It is desirable to increase the resolution of a photographic image, using available technology cost, reduce reciprocity failure, while preserving adequate grey scale.

SUMMARY OF THE INVENTION

It is an object of the present invention to provide a method and apparatus for printing high resolution images using reflective LCD modulators. The present invention is directed at overcoming one or more of the problems set forth in the background of the invention.

Briefly summarized according to one aspect of the present invention, an apparatus for printing high resolution images on a photosensitive media comprises an array of LEDs for forming a light beam and a telecentric lens which transforms the light beam to a telecentric beam. A polarizing beamsplitter splits the telecentric beam into a first polarized beam and a second polarized beam and directs the first polarized beam to a first reflective LCD modulator and directs the second polarized beam to a second reflective LCD modulator. The first reflective LCD modulator rotates a first polarization state of the first polarized beam on a site by site basis to produce a first modulated polarized beam and reflects the first modulated polarized beam, in response to a first image data signal, through the polarizing beamsplitter. The second reflective LCD modulator rotates a second polarization state of the second polarized beam on a site by site basis to produce a second modulated polarized beam and reflects the second modulated polarized beam, in response to a second image data signal, through the polarizing beamsplitter. A print lens focuses the first and said second modulated polarized beams on the print media. In the preferred embodiment, the media is exposed in a color sequential manner with a two-dimensional color image. The media or the assembly may then be moved to a second position and a new image is printed. The LEDs are arranged in a two-dimensional pattern and are addressed in a series of pulses of varying amplitude and duration, in a color sequential manner to provide illumination of varying light levels to the reflective LCD modulator, thus extending the gray scale available through the reflective LCD modulator.

In another embodiment, the illumination optics lens is comprised of a collimating lens, a lenslet array, and a telecentric condensor lens which provide uniform, telecentric illumination. Light of one polarization state incident on the polarizing beamsplitter is channeled in the direction of one reflective LCD modulator located at one facet of the polarizing beamsplitter, and light of the opposite polarization state is channeled in the direction of a second reflective LCD modulator located at another facet of the polarizing beamsplitter.

Uniform light incident on a reflective LCD modulator is modulated on a site by site basis. Image data is displayed on the reflective LCD modulator as a series of frames corresponding to the illumination level and color. The voltage supplied to the reflective LCD modulator varies with the illumination wavelength. Light modulated by the reflective LCD modulator is passed through the polarizing beamsplitter and a print lens. Image data to each of the modulators contains independent data the superposition of which creates a composite image. Also, because the polarization states at the two facets on the beamsplitter are opposite, the data at the reflective LCD modulators are opposite.

The print lens assembly is used to provide a high contrast magnified image at the image plane. At the image plane, multiple images from each reflective LCD modulator are generated in a color sequential manner and imaged on a two-dimensional area on the media. Upon completion of exposure of a given image, the media is advanced and the next image is exposed.

In an alternate embodiment of the invention, a polarizing beamsplitter superimposes image data from each of the modulators in an interweaved manner such that the composite image at the media is comprised of two images displaced by an integer number of half pixels.

In an alternate embodiment of the invention, a large polarizing beamsplitter is employed to juxtapose image data from the modulators such that the composite image at the media is twice the width of the image of a single modulator.

In a further embodiment, image data is overlapped and image data is corrected at each of the reflective LCD modulators to account of regions of overlapping image data.

In another embodiment the modulators operate at different wavelengths, drive voltages, or aspect ratios.

In a different embodiment the reflective LCD modulators incorporate polarization compensators before the polarizing beamsplitter to improve contrast.

In a further embodiment, multiple reflective LCD modulators are imaged at more than one distinct location on the media by repositioning the print assembly.

A primary advantage of the present invention is the ability to produce high resolution images without reciprocity failures. Furthermore, the present invention is that a reflective LCD modulator is sufficiently fast, so that a printer according to the present invention can create gray scale in images without time delayed integration. For this reason, an apparatus according to the present invention can cover image artifacts due to image superposition without substantial mechanical or electrical complexity. The bulk of artifact reduction takes place in the software algorithms already designed for image correction.

The invention and its objects and advantages will become more apparent in the detailed description of the preferred embodiment presented below.

DETAILED DESCRIPTION OF THE INVENTION

The present description will be directed in particular to elements forming part of, or in cooperation more directly with, an apparatus in accordance with the present invention. It is understood that the elements not shown specifically or described may take various forms well known to those skilled in the art.

Figure 1:
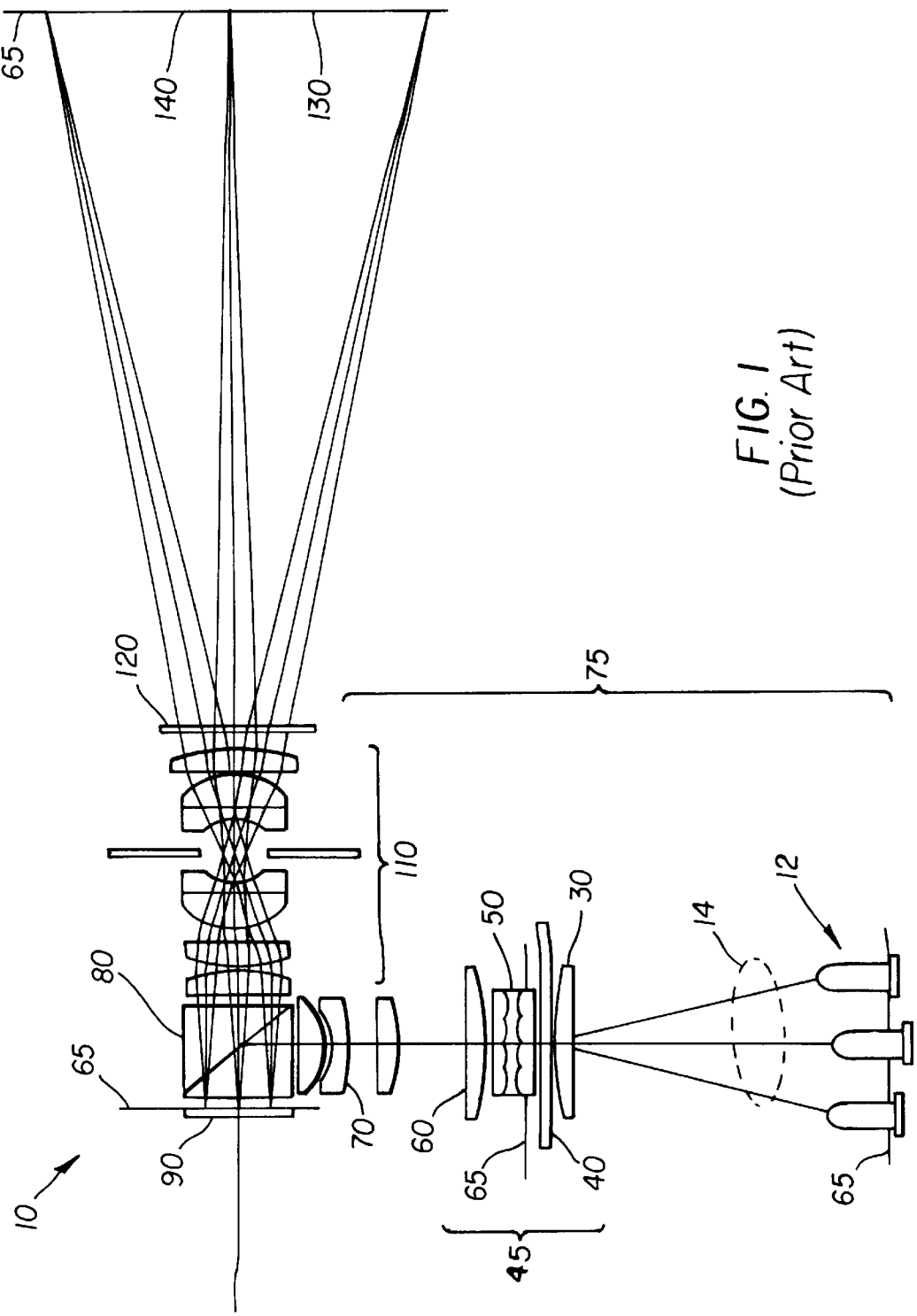
FIG. 1 is a schematic view of a prior art reflective LCD modulator system for printing two-dimensional swaths.

Referring to FIG. 1, there is illustrated a prior art printer referred to in general by numeral 10. The photographic printer is comprised of a light emitting diode (LED) 12, uniformizing optics 45, polarizing beamsplitter 80 reflective LCD modulator 90, a data path (not shown) for providing image information to the reflective LCD modulator 90, and a print lens assembly 110. The photographic printing system 10 provides a two-dimensional image on light sensitive media 140 located at an image plane 130.

The LEDs 12 are arranged in a two-dimensional array. Each of the LEDs emit one of three distinct wavelengths, red, blue, or green. The LEDs 12 are typically mounted in a circular aperture and are arranged such that the colors of emission are spread evenly about the aperture. The relative number of LEDs emitting at a given wavelength is determined by the sensitivity of the media onto which the light is imaged. For example, the array may consist of four red LEDs, two green LEDs, and two blue LEDs. The LEDs are spaced such that a significant fraction of the light emitted can be captured in the collection aperture of the illumination optics 75. Furthermore, redundancy in emitters reduces the system sensitivity to malfunction in any individual LED.

The LEDs 12 are operated in a pulsed and color sequential manner. For any given image, groups of LEDs are activated in order of wavelength. For example, the red LEDs are activated and deactivated, the blue LEDs are activated and deactivated, then the green LEDs are activated and deactivated. Any activation cycle for a given wavelength consists of a series of pulses, which may vary in duration or amplitude. The length and duration of the pulses is determined by the level of illumination needed per image to define the gray scale and by the sensitivity of the media 140 to light level and illumination time. It should be noted that certain photosensitive media require only monochromatic illumination. For such applications, LEDs of a single wavelength are employed and there is no color sequence. Following each LED 12 the system may include a collimating lens 14, or alternatively a Fresnel lens.

Each of the LEDs 12 is mapped by the illumination optics 75 to cover the area of the reflective LCD modulator 90 in a uniform and essentially telecentric manner at the modulator plane 65. This design is unique to printing applications because the requirements for uniformity of illumination and uniformity of image are far more stringent in printing then in projection display. Specifically, the tolerance to roll-off at the edges of the illumination is much greater in a projection system. The telecentricity is required to maintain the uniformity of the image at the image plane 130 due to constraints on the LCD operation. The conjugate plane 65 is shown in FIG. 1 and referred to throughout the remainder of the specification.

The illumination optics 75 is designed to illuminate a nearly square or rectangular aperture. In general, axially symmetric components are employed in the illumination. Following the LEDs 12 are uniformizing optics 45 comprising a field lens 30 that images light to a lenslet array 50 and field lens 60. The light at the intermediate conjugate plane 65 is broken into a number of portions equivalent to the number of elements in the first portion of lenslet array 50. The individual portions are then superimposed and magnified by the second portion of lenslet array 50 and the field lens 60. A condenser lens 70 is positioned immediately before the polarizing beamsplitter 80.

In a single reflective LCD modulator imaging system a linear polarizer 40 may be incorporated in the illumination optics 75 prior to the polarizing beamsplitter 80. However, for a system designed to illuminate multiple devices, the optical system can be modified to incorporate two distinct polarization states by simply utilizing multiple states of polarization produced by the source. Light from the LEDs 12 is randomly polarized. Consequently light of one polarization state passes through the polarizing beamsplitter 80 while light from a second state of polarization is directed at a right angle. The distance from the lenslet array 50 to the plane of uniform illumination 65 is equidistant for each of the paths. A multiple reflective LCD modulator system can incorporate one reflective LCD modulator at each facet of the polarizing beamsplitter to which the incident light is directed.

Figure 2A:
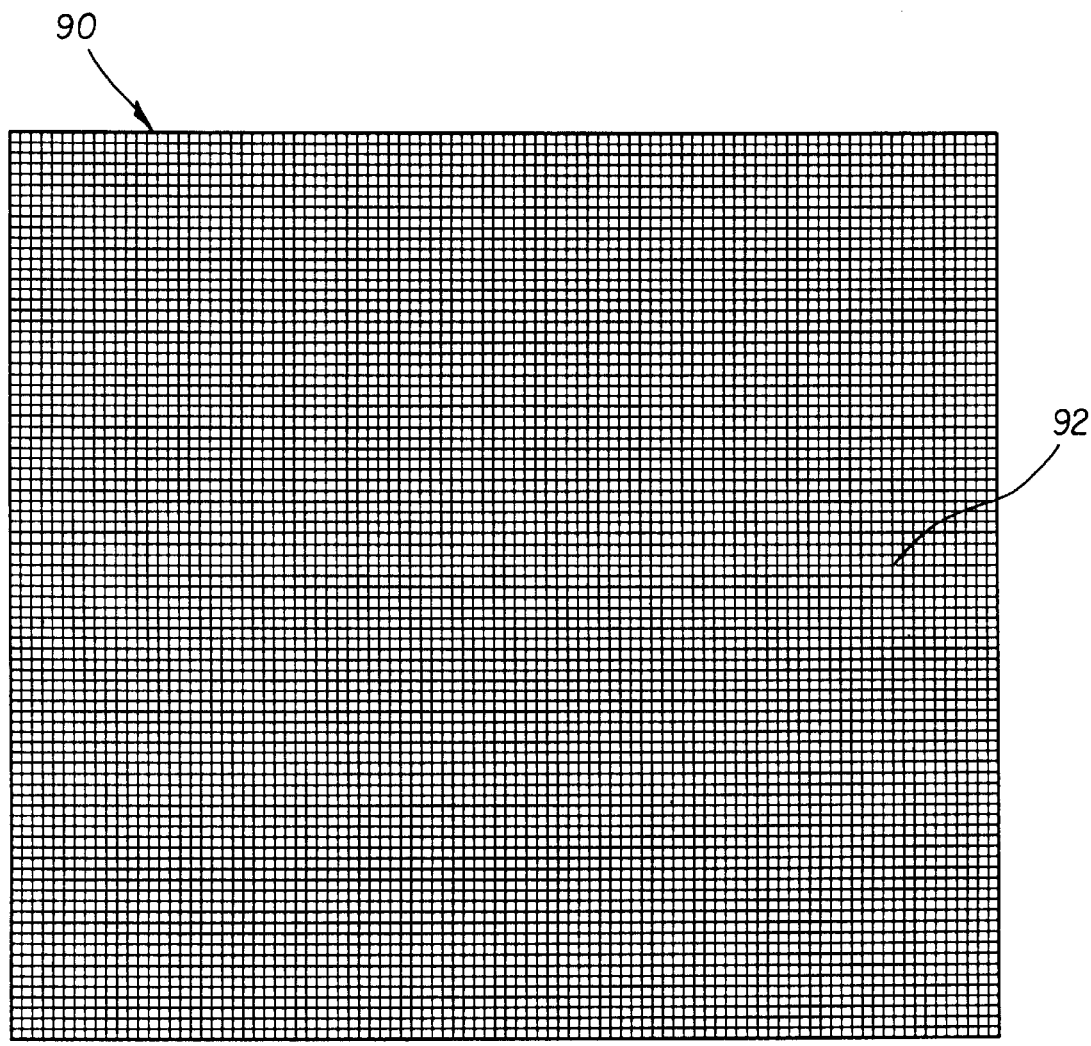
FIGS. 2a and 2b are a top plan view and a side view in cross section, respectively, of a reflextive LCD modulator.
Figure 2B:
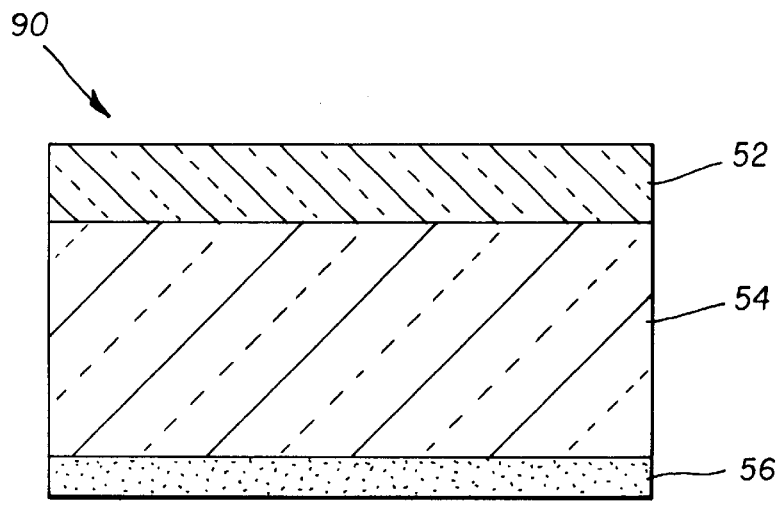

FIGS. 2a and 2b show a top view a reflective LCD modulator as used in the present invention. The reflective LCD modulator 90 consists of a plurality of modulator sites 92 that are individually modulatable. Light passes through the top surface of LCD 52, liquid crystal material 54, of reflective LCD modulator 90, is reflected off the back plane of LCD 56 of the modulator, and returns through the modulator. If a modulator site 92 is "on" or bright, during the round-trip through the reflective LDC modulator 90, the polarization state of the light is rotated. In an ideal case the polarization state of the light is rotated 90 degrees. However, this degree of rotation is rarely easily achieved. If a given modulator site is "off" or dark, the polarization state of the light is not rotated. The light that is not modulated is not passed straight through the polarized beamsplitter 80 but is redirected away from the light sensitive media 140 plane by the polarized beamsplitter 80. It should be noted that the polarization state of the light that is rotated by a reflective LCD modulator 90 may become elliptically polarized, however, upon passing through a linear polarizer 120, shown in FIG. 1, the light will regain linearity.

Referring again to FIG. 1 the reflective LCD modulator 90 and the polarized beamsplitter 80 are followed by print lens assembly 110 and a linear polarizer 120. This lens assembly provides the correct magnification of the image of the reflective LCD modulator 90 to the image plane 150 where the media light sensitive media 140 is located. The print lens assembly 110 is designed to provide magnification relating to a given image size at the media plane. Once imaged at the media plane, the printer moves the media to a next position and the next image is recorded. In any system on any media on which images are created at multiple wavelengths, the composite tri-color image will be referred to as an image.

The most readily available choice of reflective polarization based modulators is the reflective liquid crystal modulator. Such modulators, originally developed for use in projection display, can have resolutions as high as 4000× 2000 modulator sites. Currently, resolutions of 1200×1600 are available with footprints as small as 0.9 inches diagonal.

These high resolution reflective LCD modulators, are often twisted nematic LCDs, or homeotropically aligned reflective LCD modulators, although other types of reflective LCD modulators such as ferroelectric are often employed in projection display. Some of the key characteristics of these LCDs are high resolution; the high contrast (>100:1) in all three primary colors; fast frame rate, 70 frames per second or higher; and the high aperture ratio, i.e. greater than 90%. In addition, the incorporation of a CMOS backplane increases the uniformity across the array. The LCDs are also capable of producing an eight bit gray scale either through pulse width modulation or through analog operation. In either case data may be introduced digitally to the printing system. These characteristics ensure that the reflective LCD modulator is an excellent choice for use in a reflective printing system.

The reflective LCD modulator 90 can be designed in a number of different configurations. The most amenable to a low cost printing system is a single chip system used in color sequential mode. Such an LCD may be either specifically designed for color sequential use, often incorporating a faster backplane and slightly different liquid crystal compositions, or can be a single chip with a 60 to 70 frame per second backplane. The latter option is sufficient for printing because the high frame rates are not a necessity and often reduce the bit depth of the resulting image. However, while many liquid crystals are the same basic crystal for all three primary color wavelengths, sometimes, either due to the specific applied voltage or the liquid crystal thickness, operation may differ in the three wavelengths. Specifically, for a given liquid crystal composition, depth, and applied voltage, the resulting polarization rotation on an incident beam may vary with wavelength. The efficiency and contrast of the modulation will vary among the three colors. This optical system is designed to image and pass light with a rotated polarization state. However, the degree of rotation will vary as a function of wavelength. In the bright, or "on" state, this difference in rotation will affect the efficiency of the system. In other words, the percentage of incident light that is actually modulated and imaged on the media plane will vary. This difference in wavelength efficiency can be accounted for by varying the illumination strength, and exposure time. Also, the media requires different power densities in the different wavelengths. More significant problems arise in the dark or "off state". In this state, the polarization state of the light is not rotated and should not be directed thought the polarizing beamsplitter 80 and imaged. If the polarization state of the light is in fact rotated, light will leak through the imaging system and decrease the contrast.

The present invention is designed for is a two dimensional reflective polarization based reflective LCD modulator. FIG. 3 depicts a multiple reflective LCD modulator based optical system. Of the incident light 122, light of the s-polarization state 124 passing through the polarizing beamsplitter 80 is redirected to the plane of the reflective LCD modulator 90. The p-polarization state 128 is passed through the polarizing beamsplitter 80 and is directed onto reflective LCD modulator 95. In this manner, the optical system utilizes multiple reflective LCD modulators without reducing the light intensity at the modulator and therefore without inhibiting system productivity. Light impinging on each reflective LCD is modulated and reflected back 126, 129 through the polarizing beamsplitter 80. Modulated light from the reflective LCDs are passed through the polarizing beamsplitter 80 to the print lens assembly 110 assembly and subsequently imaged at the image plane 130 onto the light sensitive media 140.

The light directed onto the reflective LCD modulator 90 is essentially telecentric. This aspect of the invention sets it apart from systems generally used for projection display. If the light impinging is not telecentric, then modulation across the different angles of incident light is not uniform which will lead to a severe degradation in contrast.

Light impinging on reflective LCD modulator 90 is of the spolarization state 124. Light that is modulated at reflective LCD modulator 90 is reflected p-polarized 126, and passes through the polarizing beamsplitter 80 to the image plane. Light impinging on reflective LCD modulator 95 is p-polarized state 128. Modulated light from reflective LCD modulator 95 is reflected s-polarized 129 and passes through the polarizing beamsplitter 80 and is imaged at the image plane 130. Because light directed to the image plane is of opposite polarization states, polarization sensitive elements between the polarizing beamsplitter 80 and the image plane should be avoided.

In some applications, it may be necessary to provide data at one reflective LCD modulator that is the inverse of the data at the other. If the data were inverted, the image at the media plane from one reflective LCD modulator would be the negative of the data from the other reflective LCD modulator. In such a system, a polarizer 47 after the polarizing beamsplitter would pass one image intact, while the data from the LCD for which the polarization state and data are inverted would be further modified. While this provides additional control over image data, it is cumbersome and often unnecessary.

Additionally, because each of the reflective LCD modulators in FIG. 3 is operating on light of opposite initial polarization states, the activation voltage may differ between the two modulators. Ideally, s-polarization is converted to p-polarization at the first modulator, and p-polarization is converted to s-polarization at the second modulator. However, because polarization rotation is not perfect at the modulator, care must be taken in the addressing scheme to allow adequate modulation at each device.

It should be noted that in all embodiments featuring a polarizing beamsplitter 80 and the use of multiple reflective LCD modulators, discussion has centered around the use of two reflective LCD modulators. This approach however, can be generalized to many reflective LCD modulators, as there are facets on the polarizing beamsplitter 80. Additionally, multiple polarizing beamsplitters and x-prisms may be employed to incorporate multiple devices. For the sake of simplicity, all discussion contained herein refers to two reflective LCD modulators.

One aspect of this invention that separates the design and implementation from projection display is the contrast required for printing. In particular, photosensitive media may require contrast as low as 30:1 for a particular color. Also, in general, the contrast requirement for red light is more severe than that required for blue light because the media on which data is projected is generally more sensitive to blue light. In projection display systems contrast of greater than 100:1 is often required. Furthermore, contrast requirements are equally stringent in all three colors. The design implications of these differences are significant. With two LCDs in place, the total amount of leakage light passing through the cube in the imaging system would double from that of a single LCD system. Leakage in both polarization stares would degrade the contrast. In single LCD systems, a linear polarizer can be placed after the cube to clean up leakage. Such a solution would be unacceptable in a two LCD system. Use of two separate modulators operating in opposite polarization states, inhibits the use of polarization compensation elements following the polarizing beamsplitter. For example, a polarizer placed to clean up leakage p-polarization light from reflective LCD modulator 95 would increase the contrast of reflective LCD modulator 95. It would concurrently reduce the peak light level and contrast from reflective LCD modulator 90. In a printing application, the loss in contrast may not be catastrophic. For example, contrast may drop from 140:1 to 60:1. The latter contrast is well within the range of may different photographic media, however, it is too low for the average projection system.

Another major difference stems from the independent color requirements. Because the required contrast for red light printing is often greater than that required for the other colors, a color sequential system is an achievable goal. Specifically, a device and optical system designed primarily around red light is adequate in the blue and green. So, a single chip color sequential system does not require a special LCD and can be implemented with a device designed for color separated projection. It may be necessary to change the backplane voltage of the LCD as a function of illumination wavelength. When the system is generalized to multiple reflective LCD modulators, each reflective LCD modulator can operate color sequentially with LCDs designed for either color sequential or color recombination. In a color sequential projection system, special devices designed for color sequential operation, providing high contrast in all three colors, must be employed. Such devices are not readily available and produce insufficient brightness at the image. Consequently, color recombination systems are favored in many projection systems. To create two composite images in a color recombination system, six LCDs need to be incorporated. Two reflective LCD modulators in each of the colors would have to be integrated into the optical system. Such an optical system would require more complicated optics as well as additional expense.

Figure 3A:
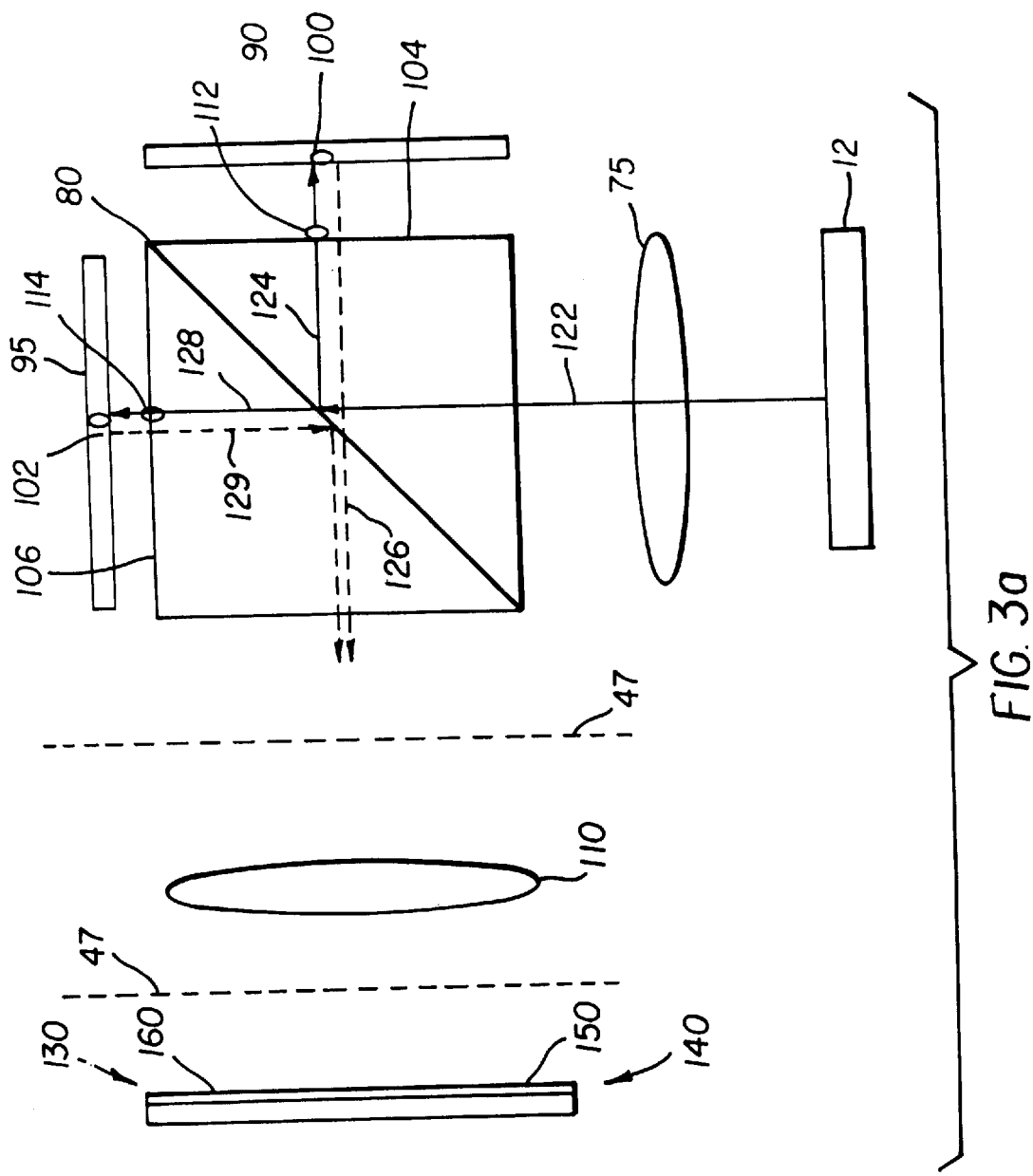
FIGS. 3a and 3b are schematic views of reflective LCD modulator based printing system utilizing a polarizing beamsplitter and two reflective LCD modulators.

In the embodiment of the invention shown in FIG. 3a, the images created at the media 140 by the two reflective LCD modulators 90, 95 overlap and are registered with zero displacement. The centers 100, 102 of the reflective LCD modulators 90, 95 line up with the center of the polarizing beamsplitter facets 112, 114 respectively. Such a system does not increase resolution, but reduces the time required to print by increasing the net light level at the media thus increasing the productivity. Also, site defects may be covered up or compensated.

Figure 3B:
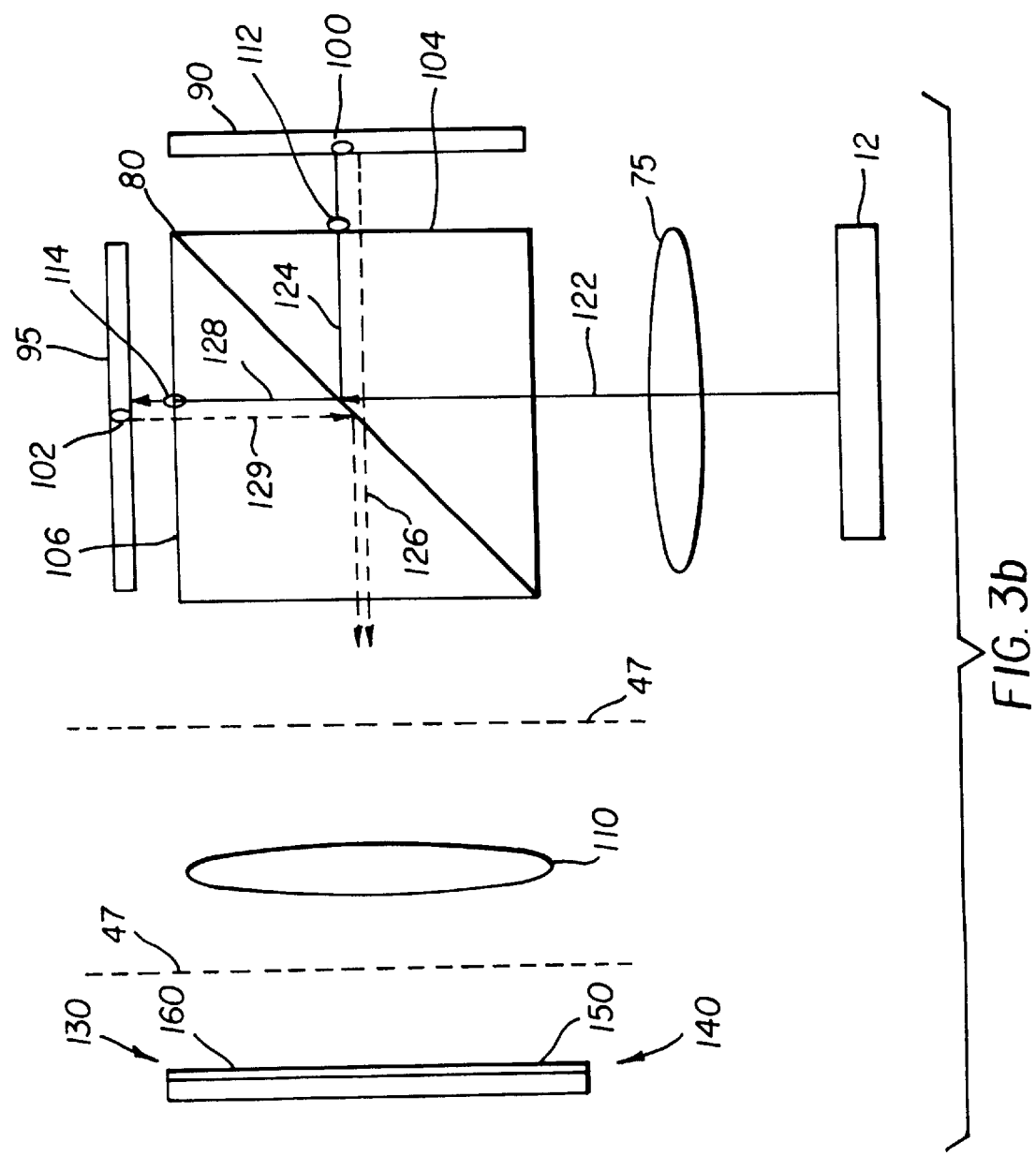
Figure 4A:
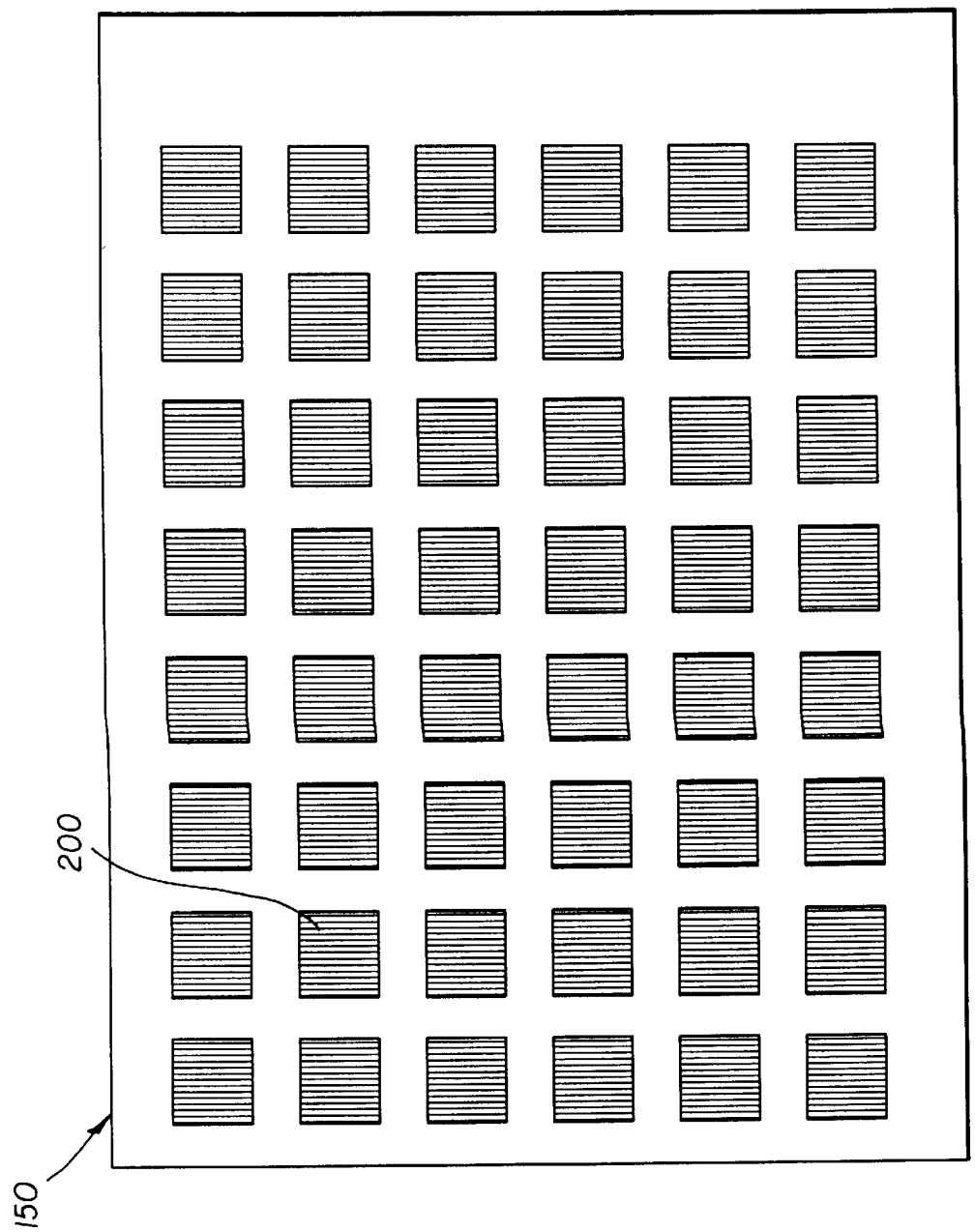
FIGS. 4a–4c is an interwoven image of two LCDs at the media.
Figure 4B:
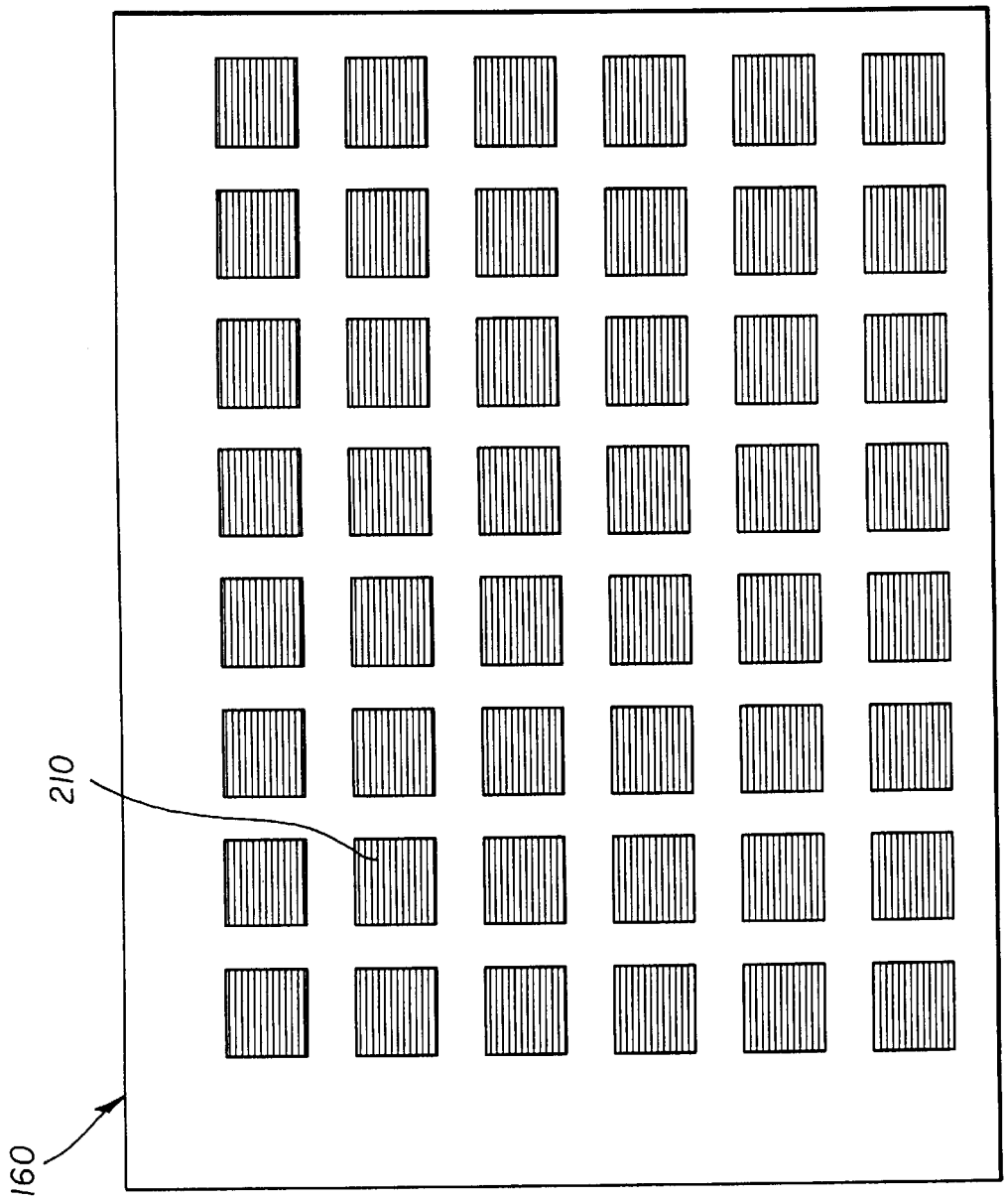
Figure 4C:
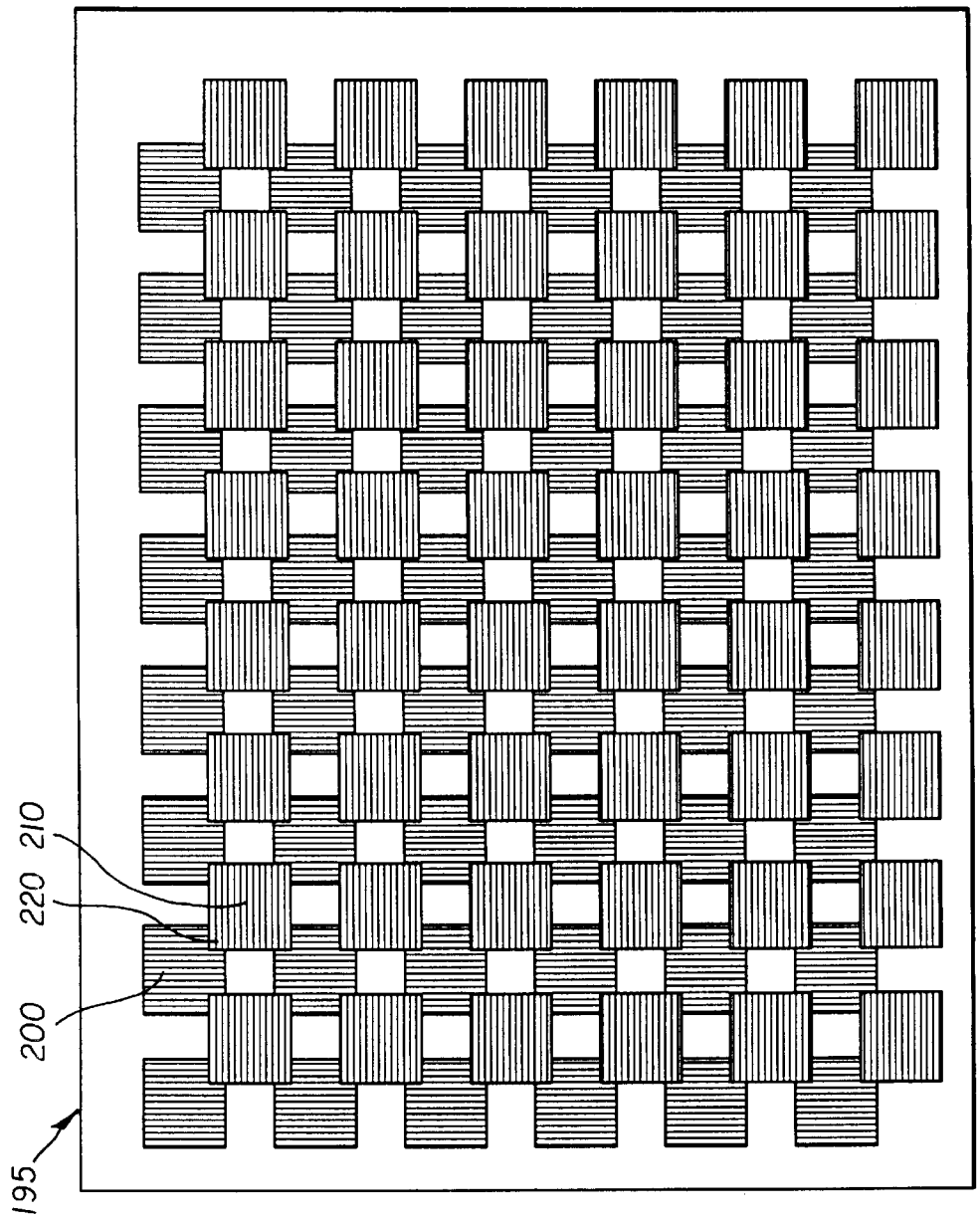

In another embodiment shown in FIG. 3b two LCDs are employed at two separate facets 104, 106 of the polarizing beamsplitter 80. The lateral position of each LCD in the plane parallel to the polarizing beamsplitter 80 is chosen such that the resulting image at the media is an interwoven image. Specifically the centers 100, 102 of the reflective LCD modulators 90, 95 are displaced from the centers 112, 114 of the facets of the polarizing beamsplitter such that the composite images of reflective LCD modulator 90 and reflective LCD modulator 95 are displaced. Specifically referring to FIGS. 4a and 4b, the image 150 of reflective LCD modulator 90 is similar to the image 160 of reflective LCD modulator 95. At the image plane, the image of reflective LCD modulator 90 is displaced from the image of reflective LCD modulator 95 by one half the center to center spacing along the diagonal of a modulator site. In effect, the composite image is the result of two diagonally displaced images as is shown in FIG. 4c. For a high fill factor device, there exists a region of overlap 220 between the image of modulator site 200 from reflective LCD modulator 90 and modulator site 210 from reflective LCD modulator 95. This composite image 195 carries twice the image data of a single LCD image. The data from one image lies in the inter-pixel region of the other image. It should be noted, that such interweaving can just as easily occur along a single axis instead of diagonally. Also the displacement along any axis can be designed to be distances other than ½ pixel. For example, the displacement may by m/2 pixel widths, where m is any odd integer. The ½ pixel distance was chosen such that image data of one image lies directly in the interpixel region of the other images. Also, the displacement between images occurs at such a high frequency that image artifacts resulting from the composite image are not readily visible.

Figure 5:
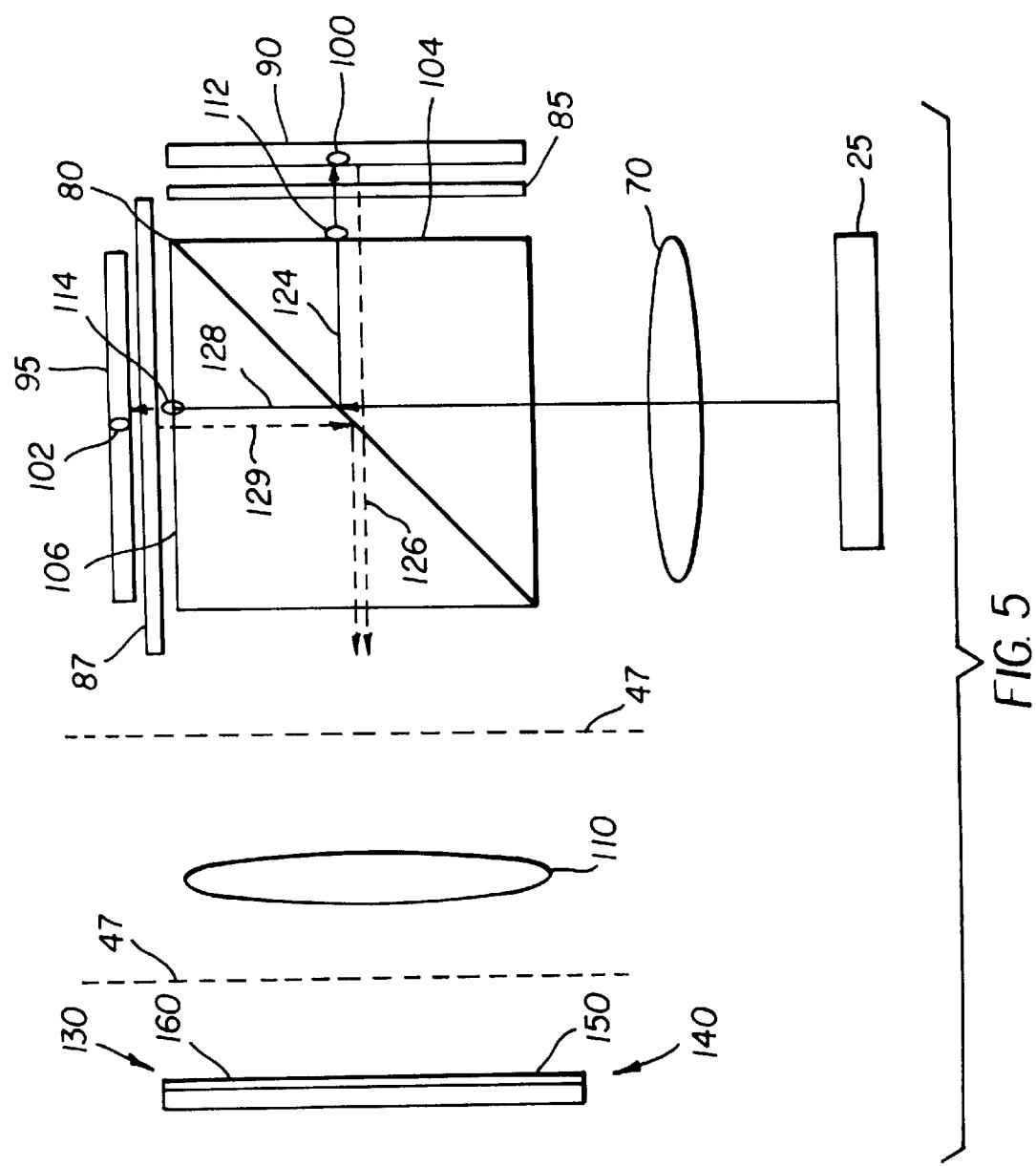
FIG. 5 is a schematic view of a reflective LCD modulator based printing system utilizing a polarizing beamsplitter, two reflective LCD modulators, and polarization compensation elements.

In some cases, the contrast is inadequate in all colors. For such cases, a polarization compensator 85, 87 may be introduced in the path of the optical beam at each reflective LCD modulator 90, 95 to correct the polarization state of the light as is shown in FIG. 5. A compensator may be placed in the optical path prior to the polarizing beamsplitter 80 in front of each LCD to particularly correct the off state of the light. However, if the design is to be truly efficient for each wavelength, the system would require three compensators placed sequentially in front of each LCD with the illumination timing.

Figure 6:
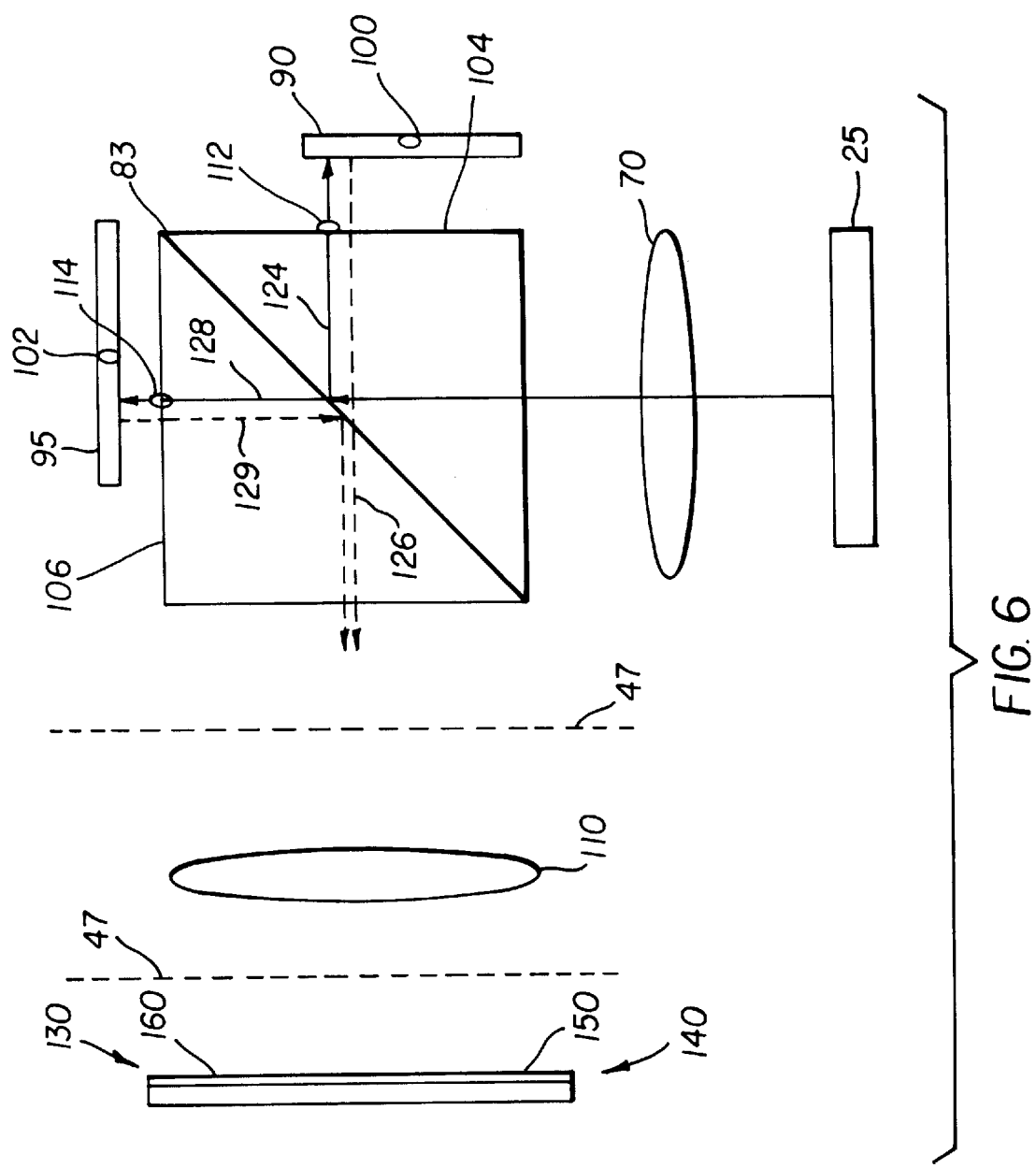
FIG. 6 is a schematic view of a reflective LCD modulator based printing system utilizing a polarizing beamsplitter and two reflective LCD modulators.
Figure 8B:
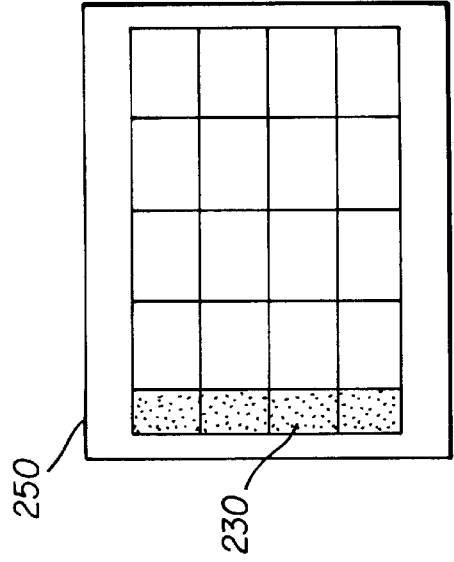
FIGS. 8a–8d shows the effect of dithering an apertured reflective LCD modulator using four distinct image positions.
Figure 8D:
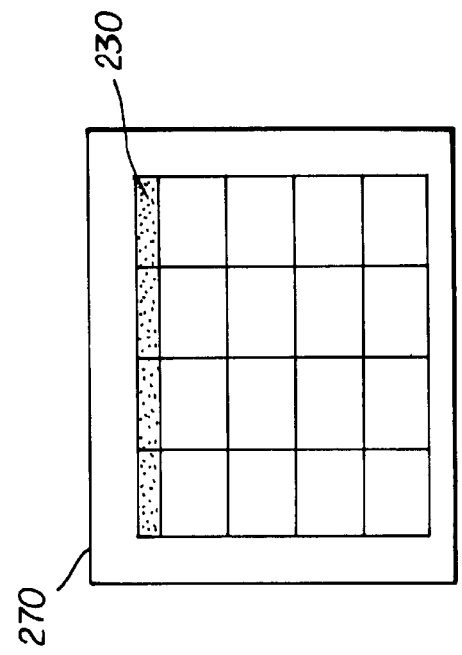
Figure 8A:
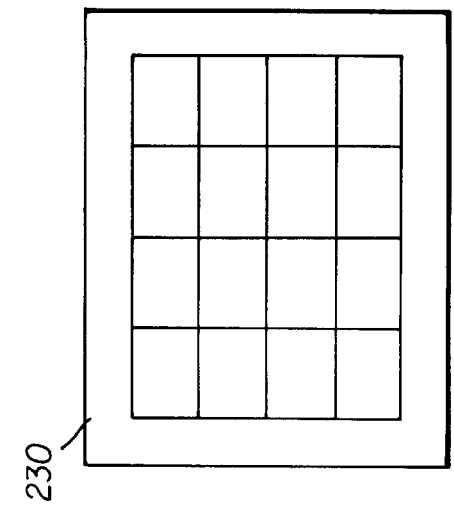
Figure 8C:
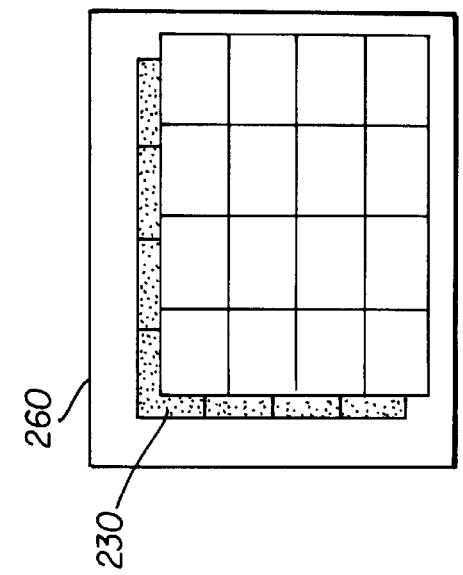

In another embodiment of the invention, the composite image of the multiple LCDs are juxtaposed. In order to juxtapose images, the large polarizing beamsplitter 83 is approximately twice the width of the reflective LCD modulator 90 as is shown in the system of FIG. 6. The two reflective LCD modulators 90, 95 are displaced from the center axis of the cube 112, 114 such that the composite image at the media plane 130, 140 is comprised of two images 150, 160 juxtaposed. This method of printing will allow large, high resolution prints.

Figure 7:
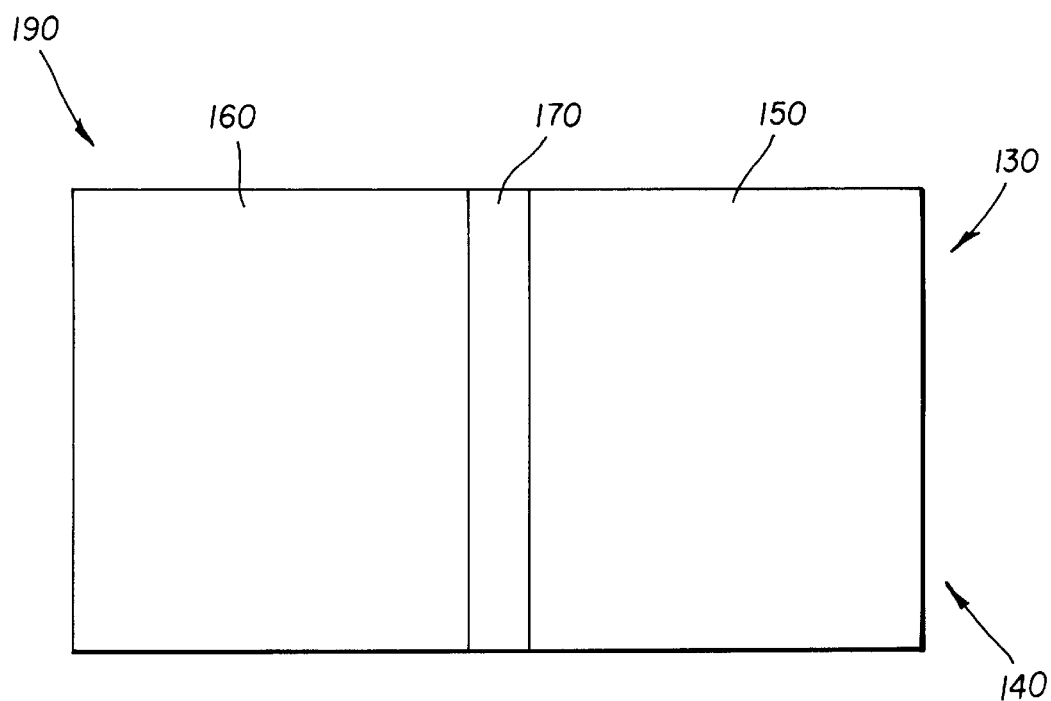
FIG. 7 is a juxtaposed image of two reflective LCD modulators at the media plane.

Often when images are placed close together, it is difficult to hide the border along which the images line up at the media. For this reason, the two images are easier to correct if there exists a region of overlap 170 of the two images 150, 160 on the composite image 190 at the media plane 130, 140 as is shown in FIG. 7. In the region of overlap 170 may range in width from one pixel to hundreds of pixels. The image data at each LCD must be processed in a manner to allow for the composite nature of the image in the region of overlap.

One of the issues when printing with a two-dimensional modulator is the effect of modulator site defects. Another possible issue is a need to increase resolution for larger print sizes for each device. Both these issues can be addressed through dithered printing. To dither a reflective LCD modulator, the modulator is imaged at one position, the modulator is repositioned a fraction of a modulator site distance away or multiple number of modulator site widths away, and imaged. In so doing, multiple images are created and overlapped. By overlapping multiple images, the system acquires a redundancy that corrects for modulator site failure or drop out. Furthermore, interpolating and updating the data between positions increase the effective resolution. One particular dithering scheme is depicted in FIGS. 8a–8d The reflective LCD modulator 90 is positioned at an initial position 230 and imaged. The reflective LCD modulator 90 is moved to a second modulator position 250 one half of a modulator site laterally displaced from the initial LCD position 230. The reflective LCD modulator 90 is imaged at that position. The reflective LCD modulator 90 is then displaced to a third modulator position 260 one half of a modulator site longitudinally from the second modulator position 250, which means it is diagonally displaced from the initial LCD image 230. The reflective LCD modulator 90 is illuminated and the media exposed again. The reflective LCD modulator 90 is then moved to a fourth modulator position 270 that is laterally displaced from the third modulator position 260. The media is exposed at this position. Effectively, there is a four fold increase in the amount of data written. This serves to increase image resolution and provide means to further sharpen images. With a high aperture ratio, it may be sufficient to simply dither in one diagonal direction to achieve comparable results.

Dithering requires motion of the LCD in two directions in a plane. Each motion is approximately between 5 $\mu$m and 20 $\mu$m for a typical reflective LCD modulator. In order to achieve this motion, many different actuator or motion assemblies can be employed. For example, the assembly can use two piezo-electric actuators.

It is important to mention the differences between interweaving and juxtaposing. A juxtaposed image may be dithered for higher resolution. An interwoven image would require extremely small apertures for efficient dither. Consequently, for high speed imaging, interweaving may be a more suitable choice, while for very high resolution images juxtaposing may be preferred.

When an image is interwoven, the composite image, undithered, provides the same resolution of a dithered single device print. However, dithering takes time. In effect, a dithered image is a composite of 12 images, red, green and blue images, created at 4 distinct locations. An interwoven image is the composite of 3 images, a red image, a green image, and a blue image. For higher speed applications, interweaving is faster than dithering a single chip system. While the interwoven image may also be dithered, the result may not provide any marked advantage because the interpixel regions at the image have already been written.

Figure 9:
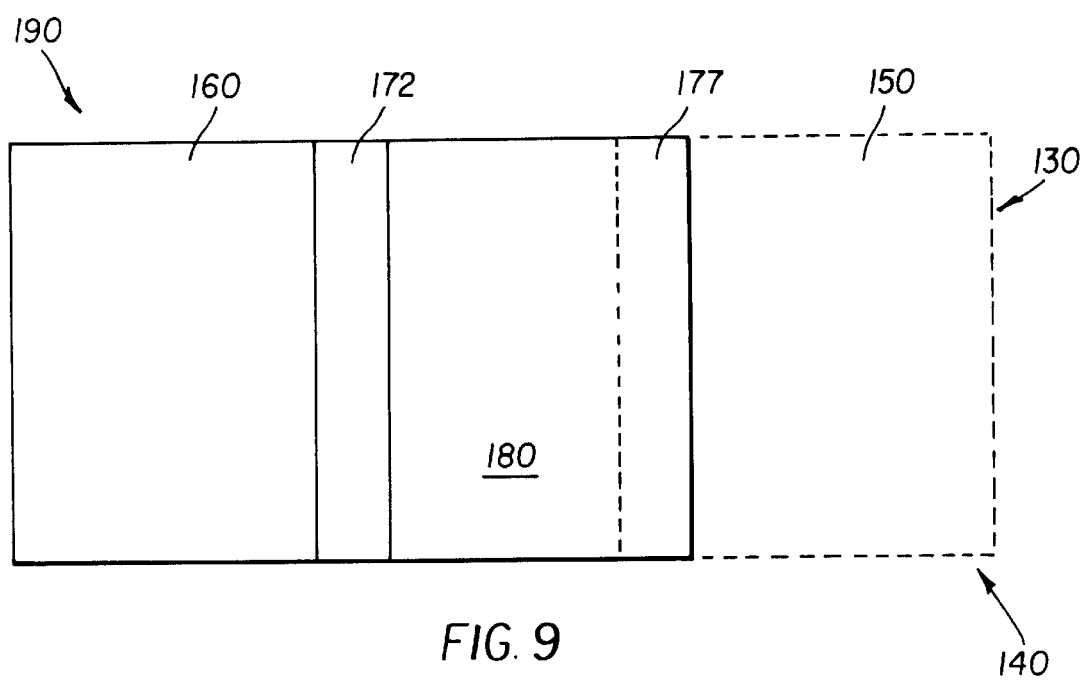
FIG. 9 is an image created at multiple image locations on the media.

In an alternate embodiment, it is possible to move the media to the next position and record the next image, where the next image is a continuation in space of the original image. Thereby, creating a final image that is a juxtaposition of multiple images. In order to employ this method, either with a single reflective LCD modulator system as depicted in FIG. 1, or with the dual LCD system shown in FIG. 3, an image 150 is created at one position, the media is advanced to a next position, a second image 180 is created, the image is advanced to a next position, and another image 160 is created. The composite image 190, shown in FIG. 9, is a superposition of three images at three different media positions, each as much as one full modulator width apart. The regions of overlap 172, 177 need not lie in the center of the image. Consequently, if any image artifacts are created they are displaced from the center viewing region.

Figure 10:
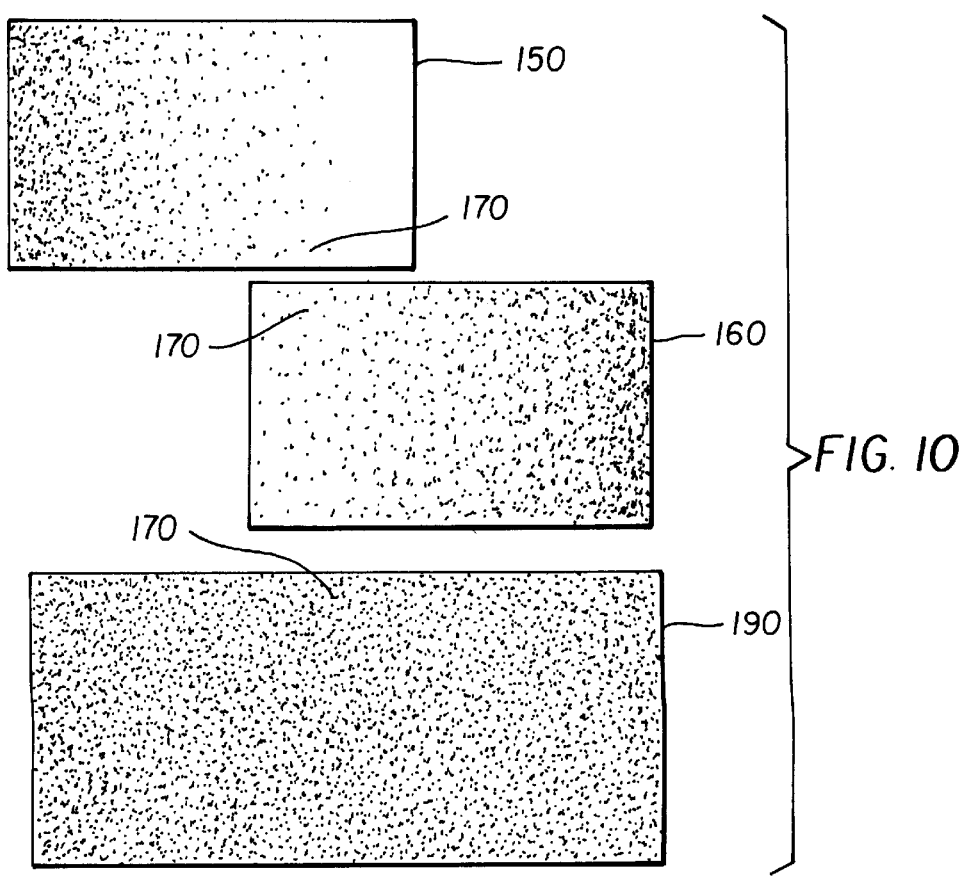
FIG. 10 is an image created by media motion.

In yet another embodiment, the region of overlap is accomplished through a gradual density shift. In FIG. 10, the first image 150 tapers off in density as the second image 160 density is increased. The overlap region 170 is carefully measured and established as a function of gray scale as well as taper. The composite image 190 of a flat field should be uniform. This method can be employed through multiple reflective LCD modulator juxtaposition or through motion of the media. The advantage of such a system is that hard lines, or discontinuities can be masked.

One of the key aspects governing this printing system and applicability to all embodiments is the means used to achieve sufficient uniformity while retaining the gray scale. The reflective LCD modulator 90 alone can receive up to 8 bits of bit depth. However, 8 bits to the modulator may not translate to 8 bits at the media. To print an adequate gray scale, additional bit depth must be provided. Furthermore, reflective LCD modulators are known to have some measure of roll-off or loss of contrast at the edges of the device. To address both these issues, the print system takes advantage of the fact that modulators designed for projection display generally refresh data faster then is required for printing. Consequently, it is possible to create a single color image at the media as a super-position of a series of images of a given color. The individual images that comprise the final image vary both in information content and illumination.

First, every image is broken into the three basic color components. Information corresponding to the red content of the image is displayed on the modulator. Within each color, multiple frames of image data are displayed on the modulator. Once an acceptable frame is displayed on the modulator, the first illumination pulse is employed. Following the recording of the initial frame of data, a subsequent frame is displayed on the modulator. The illumination level of the subsequent frame is altered according to the density requirements at the media. Similarly, as many frames as may be needed are introduced at the modulator and imaged at the media with the illumination adjusted accordingly. It is possible to maintain the same image data at the modulator and by altering the illumination level alone, introduce additional bit depth. By varying the illumination level, (and/or duration), and by altering the information content, the system can build a composite image out of a series of preliminary images. The superposition of the images in a given color of varied information content and varied illumination level introduces additional bit depth to the composite image. Once a given color is printed the same procedure is repeated with the data and illumination corresponding to the next color.

Creating a balanced composite image comprised of several images provides many challenges both in gray scale generation as well in elimination of artifacts. When multiple LCDs are employed each LCD transmission and gray scale profile must be mapped. The image data transmitted to each LCD must reflect the characteristics of that device, for the illumination of the system. For example, reflective LCD modulator 90 in FIG. 3 may have higher transmission characteristics than reflective LCD modulator 95. The corresponding image data must reflect the discrepancy and balance it out, there are several ways to balance such a discrepancy. First, each device can be loaded with its own electro-optic response curve. The top surface of LCD 52 and backplane of LCD 56 voltages can be set independently. The code values can be mapped differently to the two devices. For example, code value 200 for reflective LCD modulator 90 may actually be a shorter pulse duration in a pulse width scheme or a lower drive voltage in analog scheme than code 200 for reflective LCD modulator 95, if reflective LCD modulator 95 does not have an equal transmission characteristic, or the net light level reaching or departing reflective LCD modulator 95 is lower than reflective LCD modulator 90, such correction would be required. Each device will require it's own gray scale calibration. It is possible for devices that are mapping 14–16 bit tables to a 8 bit device, then the same driver board may be employed, with different mappings of the two devices. In the case of interwoven images, this balancing is the primary adjustment.

The second concern in the imaging system is to correct non-uniformities in the print. The exposure system can correct for some uniformities such as roll-off at the modulator edges. One way to accomplish this is to introduce additional image data to the modulator activating only the edge modulator sites. These images are exposed and superimposed on the other images thus giving additional depth to the edge regions. An example method would be to scan a series of images taken at the reflective LCD modulators 90, 95, create data maps, and convolve all input data with initial maps of the reflective LCD modulators 90, 95 to correct the image. Similar techniques can be used to adjust for modulator non-uniformities that are known prior to operation.

Another concern is image quality and the presence of artifacts. In the interweaving method, balancing the device should be adequate. However, each device will need it's own gray scale and individual uniformity map. In the cases of image juxtaposition or stitching of images, image data needs to reflect the gray scale, the device uniformity, and the regions of overlap need to be balanced with the non-overlapped regions of the image.

For the embodiments utilizing multiple LCDs the gray scale in the region of overlapped or interwoven images needs to be established as a function of both devices. This may require a different e-o curve for that region or simply a different mapping of code values. Such an algorithm may require use of multiple exposures to isolate overlap data from non-overlap data. If this is not possible the image data should be adjusted or offset such that the composite image produces the same gray scale as non-overlapped regions.

If dithering is employed gray scale generation, uniformity correction, and artifact reduction should be mapped as a function of the dither. Because of the digital addressability of the reflective LCD modulator and the pulsed LED illumination method of illumination, this approach to printing provides an adequate bit depth and reasonable timing for use in a photographic printer.

The invention has been described in detail with particular reference to certain preferred embodiments thereof, but it will be understood that variations and modifications can be effected within the scope of the invention.

PARTS LIST

10. Printing system
12. Light emitting diodes (LEDs)
14. Collimating lens
30. Field lens
40. Polarizer
45. Uniformizing optics
47. Polarizer position
49. Polarizer position
50. Lenslet array
52. Top surface of LCD
54. Liquid crystal material
56. Backplane of LCD
60. Field lens
65. Conjugate planes
70. Condensor lens
75. Illumination optics
80. Polarizing beamsplitter
83. Large polarizing beamsplitter element
85. Polarization compensator
87. Polarization compensator
90. Reflective LCD modulator
92. modulator site
95. Reflective LCD modulator
100. Center of reflective LCD modulator 90
102. Center of reflective LCD modulator 95
104. Facet of beamsplitter element in proximity to reflective LCD modulator 90
106. Facet of beamsplitter element in proximity to reflective LCD modulator 95
110. Print lens assembly 112. Center of beamsplitter element facet 104
114. Center of beamsplitter element facet 106
120. Linear polarizer
122. Incident light
124. S-polarization state
126. Reflected p-polarization
128. P-polarization state
129. Reflected s-polarization light
130. Image plane
140. Light sensitive media
150. Image of reflective LCD modulator 90
160. Image of reflective LCD modulator 95
170. Region of overlap between image of LCD 150 and image of LCD 160
172. Region of overlap between image of LCD 160 and image of LCD 180
177. Region of overlap between image of LCD 150 and image of LCD 180
180. Intermediate image in image juxtaposition
190. Composite image
195. Composite interlaced image
200. Image of single pixel from reflective LCD modulator 90
210. Image of single pixel from reflective LCD modulator 95
220. Region of overlap between pixel image 200 and pixel image 210
230. Initial LCD position
250. Second modulator position
260. Third modulator position
270. Fourth modulator position dithering for interwoven image

What is claimed is:

1. An apparatus for printing high resolution images on a photosensitive media comprising:
   an array of light emitting diodes LEDs for forming a light beam;
   uniformizing optics which makes said light beam uniform;
   a condensor lens which transforms said uniform light beam to a telecentric beam;
   a polarizing beamsplitter which splits said telecentric beam into a first polarized beam and a second polarized beam and directs said first polarized beam to a first reflective liquid crystal display (LCD) modulator and directs said second polarized beam to a second reflective LCD modulator;
   wherein modulator sites on said first reflective LCD modulator rotate a first polarization state of said first polarized beam on a site by site basis to produce a first modulated polarized beam and reflects said first modulated polarized beam in response to a first image data signal through said polarizing beamsplitter;
   wherein said second reflective LCD modulator rotates a second polarization state of said second polarized beam on a site by site basis to produce a second modulated polarized beam and reflects said second modulated polarized beam, in response to a second image data signal through said polarizing beamsplitter;
   a print lens which focuses said first and said second modulated polarized beams on said print media; and
   wherein said first LCD modulator has a first response curve and said second LCD modulator has a second response curve, in each wavelength of illumination, and said response curves are matched to a sensitivity of said media.

2. An apparatus as in claim 1 wherein said first reflective LCD modulator is located at a first facet of said polarizing beamsplitter and said second reflective LCD modulator is located at a second facet of said polarizing beamsplitter.

3. An apparatus as in claim 2 wherein said first reflective LCD modulator is a fraction of a width of said first facet of said polarizing beamsplitter.

4. An apparatus as in claim 2 wherein said second reflective LCD modulator is a fraction of a width of said second facet of said polarizing beamsplitter.

5. An apparatus as in claim 1 wherein a direction of said first polarization beam is at an angle of 90 degrees to a direction of said telecentric beam.

6. An apparatus as in claim 1 wherein a direction of said second polarization beam is parallel to a direction of said telecentric beam.

7. An apparatus as in claim 1 wherein said second reflective LCD modulator is offset from a centerline of said telecentric beam by a fraction of a width of one of said modulator sites.

8. An apparatus as in claim 1 wherein said second reflective LCD modulator is offset from a centerline of said telecentric beam by an integral number of fractions of a width of one of said modulator sites.

9. An apparatus as in claim 1 wherein said first and said second modulated polarizing beams form an interweaved composite image on said media.

10. An apparatus as in claim 1 wherein said first and said second reflective LCD modulators are each comprised of a plurality of modulator sites arranged in a two-dimensional array.

11. An apparatus as in claim 1 wherein said array of LEDs pulse said light beam at multiple wavelengths.

12. An apparatus as in claim 1 wherein said array of LEDs pulse said light beam at multiple amplitudes.

13. An apparatus as in claim 1 wherein said array of LEDs pulse said light beam at multiple duration.

14. An apparatus as in claim 1 wherein said first reflective LCD modulator is moved to a different position and reimaged.

15. An apparatus as in claim 1 wherein said first and said second reflective LCD modulators are moved to different positions and reimaged.

16. An apparatus as in claim 1 wherein said first image data signal produces an inverted polarization state of identical data delivered to said second image date signal.

17. A method of printing high resolution images on a photosensitive media said method comprising:
   directing a beam of light from an array of light emitting diodes (LEDs) to uniformizing optics to form an uniform light beam;
   directing said uniform light beam to a condenser lens to form a telecentric beam;
   directing said telecentric beam to a polarized beamsplitter wherein said telecentric beam is split into a first polarization beam and a second polarized beam;
   directing said first polarized beam at a first reflective liquid crystal display (LCD) modulator;
   providing image information to said first reflective LCD modulators;
   rotating a first polarization state of said first polarized beam to produce a first modulated polarized beam;
   reflecting said first modulated polarized beam through said polarizing beamsplitter;
   directing said second polarized beam at a second reflective LCD modulator;

providing image information to said second reflective LCD modulators;

rotating a second polarization state of said second polarization beam to produce a second modulated polarized beam, reflecting said second modulated polarized beam through said polarizing beamsplitter;

directing said first modulated reflected polarized beam and said second modulated reflected polarized beam through a print lens; and imaging said first modulated reflected polarized beam and said second rotated modulated polarized beam on said photosensitive media.

18. A method of printing high resolution images on a photosensitive media as in claim 17 including the additional step of;

changing a direction of said second rotated reflected polarized beam so that it is essentially parallel a direction of said first rotated reflected polarized beam.

19. A method of printing high resolution images on a photosensitive media as in claim 17 wherein said LEDs are sequentially addressed by grouping of color.

20. A method of printing high resolution images on a photosensitive media as in claim 17 wherein said LEDs are arranged a two-dimensional array and are comprised of:

at least three groupings of said LEDs wherein each grouping operates at a distinct wavelength of peak emission.

21. A method of printing high resolution images on a photosensitive media as in claim 20 wherein each of said LEDs within each of said groupings serve as redundant light sources.

22. A method of printing high resolution images on a photosensitive media as in claim 20 wherein time sequential addressing of said groupings of light emitting diodes provides color sequential illumination.

23. A method of printing high resolution images on a photosensitive media as in claim 20 wherein addressing of each of said LEDs wherein each of said groupings of light emitting diodes is activated in a series of pulses of varying duration.

24. A method of printing high resolution images on a photosensitive media as in claim 17 wherein each of said LEDs are addressed by pulses of varying amplitude.

25. A method of printing as in claim 17 wherein each of said reflective LCD modulators is comprised of:

a two-dimensional array of modulator sites; and means for addressing said reflective LCD modulators to create a gray scale on a modulator site by modulator site basis.

26. A method of printing as in claim 17 wherein each reflective LCD modulator is followed by at least one polarization compensation component.

27. A method of printing as in claim 17 wherein each of said reflective LCD modulators is comprised of:

a two-dimensional array of modulator sites;

means for addressing said reflective LCD modulator to create a gray scale on a pixel by pixel basis; and means for moving each of said reflective LCD modulators into position sequentially.

28. A method of printing as in claim 17 wherein images are juxtaposed by repeatedly exposing said photosensitive media, repositioning said media, and exposing said media again.

29. A method of printing as in claim 17 wherein each of said reflective LCD modulators is translated in two directions perpendicular to the optical path such that each image in each color is the superposition of at least two spatially displaced images.

30. A method of printing as in claim 17 wherein said image data is provided to first and second reflective LCD modulators to compensate for nonuniformity in said images.

31. A method of printing as in claim 17 wherein a voltage to said first and said second reflective LCD modulators is varied for different wavelength of said beam of light.

32. An apparatus for printing high resolution images on a photosensitive media comprising:

an array of light emitting diodes LEDs for forming a light beam;

uniformizing optics which makes said light beam uniform;

a condenser lens which transforms said uniform light beam to a telecentric beam;

a polarizing beamsplitter which splits said telecentric beam into a first polarized beams and a second polarized beam and directs said first polarized beam to a first reflective liquid crystal display (LCD) modulator and directs said second polarized beam to a second reflective LCD modulator;

wherein modulator sites on said first reflective LCD modulator rotate a first polarization state of said first polarized beam on a site by site basis to produce a first modulated polarized beam and reflects said first modulated polarized beam in response to a first image data signal through said polarizing beamsplitter;

wherein said second reflective LCD modulator rotates a second polarization state of said second polarized beam on a site by site basis to produce a second modulated polarized beam and reflects said second modulated polarized beam, in response to a second image data signal through said polarizing beamsplitter, a print lens which focuses said first and said second modulated polarized beams on said print media; and wherein said second reflective LCD modulator is offset from a centerline of said telecentric beam.

33. An apparatus for printing high resolution images on a photosensitive media as in claim 32 by an integral number of fractions of a width of one of said modulator sites.

34. An apparatus for printing high resolution images on a photosensitive media as in claim 32 wherein said first reflective LCD modulator is offset from a center line of said telecentric beam.

35. An apparatus for printing high resolution images on a photosensitive media as in claim 32 wherein said second modulated polarizing beam forms an interweaved composite image on said media.

36. An apparatus for printing high resolution images on a photosensitive media as in claim 32 wherein a composite image is formed on said media by the juxtaposition of images from said first and said second LCD modulator.

37. An apparatus for printing high resolution images on a photosensitive media as in claim 36 wherein said first LCD image and said second LCD image is overlapped.

38. An apparatus for printing high resolution images on a photosensitive media as in claim 37 wherein overlapped regions of said composite image are balanced with non-overlapped regions of said composite image.

* * * * *